United States Patent
Beauvais

(10) Patent No.: US 11,254,327 B2
(45) Date of Patent: Feb. 22, 2022

(54) METHODS AND APPARATUS TO PRESENT ANTICIPATED VEHICLE MANEUVERS TO A PASSENGER

(71) Applicant: Ford Global Technologies, LLC, Dearborn, MI (US)

(72) Inventor: Brandon Beauvais, Dearborn, MI (US)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 194 days.

(21) Appl. No.: 16/325,016

(22) PCT Filed: Aug. 16, 2016

(86) PCT No.: PCT/US2016/047122
§ 371 (c)(1),
(2) Date: Feb. 12, 2019

(87) PCT Pub. No.: WO2018/034651
PCT Pub. Date: Feb. 22, 2018

(65) Prior Publication Data
US 2019/0202479 A1    Jul. 4, 2019

(51) Int. Cl.
*B60W 50/14*   (2020.01)
*B60W 50/16*   (2020.01)
*G05D 1/02*    (2020.01)

(52) U.S. Cl.
CPC ............ *B60W 50/14* (2013.01); *B60W 50/16* (2013.01); *B60W 2050/146* (2013.01); *G05D 1/021* (2013.01); *G05D 2201/0213* (2013.01)

(58) Field of Classification Search
CPC ............... B60W 50/14; B60W 50/16; B60W 2050/146; G05D 1/021; G05D 2201/0213
See application file for complete search history.

(56) References Cited

U.S. PATENT DOCUMENTS 9,035,797 B2   5/2015   Varma
9,126,525 B2   9/2015   Lynam et al.
(Continued)

FOREIGN PATENT DOCUMENTS

| | | |
|---|---|---|
| CN | 104660842 | 5/2015 |
| CN | 105835775 | 8/2016 |
| WO | 2018034651 | 2/2018 |

OTHER PUBLICATIONS

Hafeez et al., "An automomous speed control and object detection system for vehicles based on RF technology," International Journal of Advanced Research in Computer and Communication Engineering, vol. 2, Issue 9, Sep. 2013, 5 pages.
(Continued)

*Primary Examiner* — Mahmoud S Ismail
*Assistant Examiner* — Gabriel Anfinrud
(74) *Attorney, Agent, or Firm* — Brandon Hicks; Hanley, Flight & Zimmerman, LLC

(57) ABSTRACT

Methods and apparatus to present anticipated vehicle maneuvers to a passenger are disclosed. An example method includes determining an anticipated autonomous maneuver of a vehicle based on collected information corresponding to autonomous operation of the vehicle, determining a notification type to present to a passenger device based on a device type, and presenting the anticipated autonomous maneuver to a user via the passenger device based on the notification type.

20 Claims, 8 Drawing Sheets

(56) References Cited

U.S. PATENT DOCUMENTS

| | | |
|---|---|---|
| 9,180,908 B2 | 11/2015 | Van Dan Elzen et al. |
| 2013/0346168 A1 | 12/2013 | Zhou et al. |
| 2015/0022426 A1 | 1/2015 | Ng-Thow-Hing et al. |
| 2015/0134180 A1 | 5/2015 | An et al. |
| 2015/0149018 A1 | 5/2015 | Attard et al. |
| 2015/0194035 A1* | 7/2015 | Akiva .................... H04N 7/183 340/575 |
| 2015/0276421 A1* | 10/2015 | Beaurepaire ....... G01C 21/3629 701/400 |
| 2016/0031441 A1 | 2/2016 | Foley |
| 2016/0216130 A1* | 7/2016 | Abramson ......... G01C 21/3423 |
| 2017/0103571 A1* | 4/2017 | Beaurepaire ....... G01C 21/3667 |

OTHER PUBLICATIONS

Dezeen, "MINI's augmented-reality glasses allow drivers to see through the body of their car," retrieved from http://www.dezeen.com/2015/04/24/mini-augmented-reality-glasses-allow-drivers-to-see-through-the-body-of-their-car/ on May 27, 2016, 14 pages.

International Bureau, "International Preliminary Report on Patentablity," issued in connection with International Patent Application No. PCT/US2016/047122, dated Feb. 28, 2019, 6 pages.

International Searching Authority, "International Search Report and Written Opinion," issued in connection with International Patent Application No. PCT/US2016/047122, dated Oct. 24, 2016, 10 pages.

* cited by examiner

METHODS AND APPARATUS TO PRESENT ANTICIPATED VEHICLE MANEUVERS TO A PASSENGER

FIELD OF THE DISCLOSURE

This disclosure relates generally to autonomous vehicles and, more particularly, to methods and apparatus to present anticipated vehicle maneuvers to a passenger.

BACKGROUND

In recent years, autonomous vehicle control has advanced so that a vehicle is completely operable without a human driver. Accordingly, all people within an autonomous vehicle, including the person in the driver's seat are passengers. Passengers of vehicles frequently do not know or anticipate maneuvers of a vehicle as would a person that is driving and controlling the vehicle. Thus, passengers are reactive to, instead of predictive of, vehicle maneuvers.

SUMMARY

Example methods and apparatus to present anticipated vehicle maneuvers to a passenger are disclosed herein. An example apparatus disclosed herein includes an operation collector to collect information corresponding to autonomous operation of a vehicle, a maneuver detector to determine an anticipated autonomous maneuver of the vehicle based on the collected information, an alert manager to determine a notification type to present to a passenger device based on a device type, and a communicator to transmit the anticipated autonomous maneuver to the passenger device based on the determined notification type. In the example vehicle, notifications of anticipated autonomous vehicle maneuvers are determined based on autonomous operation of the vehicle and such notifications are transmitted to passengers via passenger devices based on the type of the passenger device.

An example method disclosed herein includes determining an anticipated autonomous maneuver of a vehicle based on collected information corresponding to autonomous operation of the vehicle, determining a notification type to present to a passenger device based on a device type, and presenting the anticipated autonomous maneuver to a user via the passenger device based on the notification type. In the example method, anticipated autonomous vehicle maneuvers determined based on autonomous operation of the vehicle and such notifications are presented to passengers via passenger devices based on the type of passenger device.

An example tangible computer readable storage medium disclosed herein includes instructions that, when executed, cause a machine to at least determine an anticipated autonomous maneuver of a vehicle based on collected information corresponding to autonomous operation of the vehicle, determine a notification type to present to a passenger device based on a device type, and present the anticipated autonomous maneuver to a user via the passenger device based on the notification type. In the example storage medium, anticipated autonomous vehicle maneuvers determined based on autonomous operation of the vehicle and such notifications are presented to passengers via passenger devices based on the type of passenger device.

BRIEF DESCRIPTION OF THE DRAWINGS

The figures are not to scale. Wherever possible, the same reference numbers will be used throughout the drawing(s) and accompanying written description to refer to the same or like parts.

DETAILED DESCRIPTION

Figure 1:
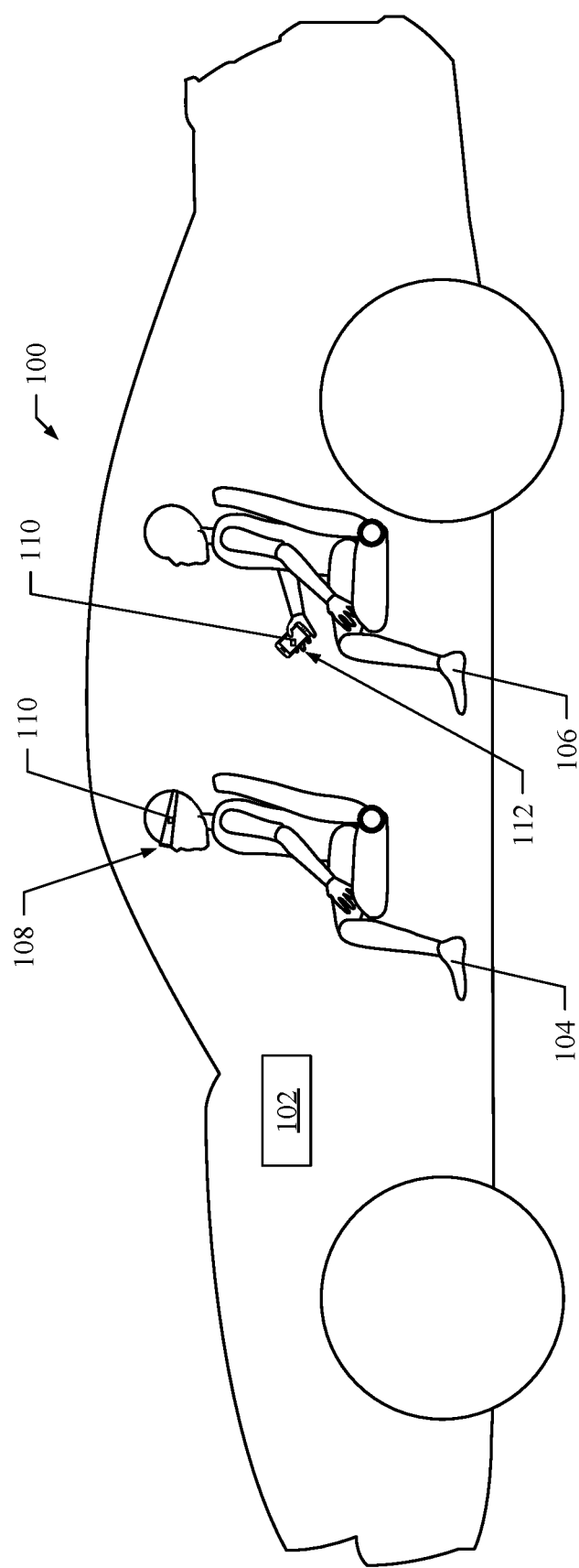
FIG. 1 is an illustration of an autonomous vehicle with passenger devices including a vehicle maneuver manager that communicates with a vehicle control system to present anticipated vehicle maneuvers to passengers in accordance with the present disclosure.

Vehicle passengers have different traveling experiences than vehicle drivers. Vehicle passengers are reactive to vehicle maneuvers, whereas vehicle drivers are proactive to vehicle maneuvers. Vehicle drivers are proactive to vehicle maneuvers because they anticipate and control the vehicle maneuvers and thus, are prepared for the maneuvers to occur. However, in autonomous vehicles, those that would otherwise be vehicle drivers are instead effectively passengers. Accordingly, none of the persons riding in an autonomous vehicle can anticipate the maneuvers of the autonomous vehicle, such as, for example, rapid acceleration, rapid deceleration, stopping, turns, accident prevention maneuvers, etc. In such instances, passengers of the autonomous vehicle may experience discomfort from being unprepared for the maneuvers of the autonomous vehicle.

The example methods and apparatus disclosed herein determine anticipated maneuvers of the autonomous vehicle based on collected information corresponding to autonomous operation of the vehicle and present the anticipated maneuvers via passenger devices to the passengers. As used herein, the term passenger device corresponds to any portable device that a passenger (e.g., a person inside of the vehicle) or a potential passenger (e.g., a person outside of the vehicle who is to enter the vehicle) may possess that is capable of pairing and/or communicating with the vehicle for the presentation of notifications of the anticipated vehicle maneuvers to the passenger or potential passenger. As a result of such presentation, the passengers may appreciate and/or proactively act in anticipation of presented future vehicle maneuvers. For example, if the anticipated maneuver is a rapid deceleration, passengers may lean backwards to counteract his or her forward inertia. In examples where a passenger device is paired and/or communicating with the vehicle, but the passenger device is outside the vehicle, a potential passenger may be notified of autonomous operations via the passenger device including, without limitation, the vehicle entering a parking location, exiting a parking location, relocating, or colliding with another vehicle or object.

In some examples, the passenger devices are augmented reality ("AR") devices. As used herein, an AR device is a device capable of presenting virtual representations in spatial relation to actual environment characteristics. AR devices include AR wearable devices, such as, for example, Google Glass™, Microsoft Hololens™, etc., or mobile devices with cameras (e.g., smart phones, tablets, etc.). In some such examples, the anticipated maneuvers are presented to a passenger via a visual representation overlaid in spatial relation to an environment in front of the autonomous vehicle (e.g., augmented reality). In some examples, the passenger devices are non-AR devices such as, for example, cellular phones, watches, smart phones/tablets incapable of AR, smart phones/tablets with AR disabled, etc. In some such examples, the anticipated maneuver is presented to a passenger via audio notifications, text notifications, haptic feedback, etc.

In some examples, the methods and apparatus disclosed herein may determine anticipated maneuvers of the autonomous vehicle based on collected information corresponding to autonomous operation of the vehicle and provide information regarding the anticipated maneuvers to other devices paired and/or in communication with the vehicle. As disclosed herein, while anticipated maneuvers are presented to passengers so that the passengers may proactively act in anticipation of the presented vehicle maneuvers, information regarding the anticipated maneuvers may be sent to other devices so that the devices may proactively act in anticipation of the future vehicle maneuvers. For example, if the anticipated maneuver is a right turn, the methods and apparatus disclosed herein may notify a maneuver-compensating cup-holder of the anticipated right turn so that the cup-holder can secure an object within the cup-holder, tilt in the direction of the right turn, or otherwise compensate for the centrifugal acceleration expected in connection with a right turn.

FIG. 1 is an illustration of an autonomous vehicle 100 including a vehicle control system 102. The vehicle control system 102 communicates with a first passenger 104 and a second passenger 106 to present anticipated vehicle maneuvers. The vehicle control system 102 communicates with the first passenger through a first passenger device 108 that includes a vehicle maneuver manager 110. In the illustrated example of FIG. 1, the first passenger device 108 is an AR device. The vehicle control system 102 communicates with the second passenger through a second passenger device 112 that also includes the vehicle maneuver manager 110. In the some examples, the second passenger device 112 is a non-AR device. In the illustrated example of FIG. 1, the vehicle control system 102 is installed within the vehicle 100. However, in some examples, the vehicle control system 102 may be a remote server in communication with an on-board computer of the vehicle 100 to obtain information corresponding to autonomous operation of the vehicle 100.

As disclosed herein, the majority of the processing required to determine anticipated vehicle maneuvers based on vehicle and environment characteristics is performed by the vehicle control system 102, by the vehicle maneuver manager 110, a remote server, or any combination thereof. For example, the vehicle control system 102 may collect information corresponding to autonomous operation of the vehicle, determine the anticipated maneuvers of the autonomous vehicle based on the collected information corresponding to autonomous operation of the vehicle, and generate notifications of the anticipated maneuvers to send to the vehicle maneuver manager 110 within one of the first passenger device 108 or the second passenger device 112 for presentation.

In some examples, the vehicle control system 102 may collect information corresponding to autonomous operation of the vehicle to send the vehicle maneuver manager 110 within one of the first passenger device 108 or the second passenger device 112. In some examples, the vehicle control system 102 may be a remote server that determines the anticipated maneuvers of the autonomous vehicle based on the information corresponding to autonomous operation of the vehicle collected by an on-board computer of the vehicle 100, and generate notifications of the anticipated maneuvers to send to the vehicle maneuver manager 110 within one of the first passenger device 108 or the second passenger device 112 for presentation. In some such examples, the vehicle maneuver manager 110 may determine the anticipated maneuvers of the autonomous vehicle based on the information corresponding to autonomous operation of the vehicle collected by the vehicle control system 102, generate notifications of the anticipated maneuvers, and present the notifications of the anticipated maneuvers to the first passenger 104 via the first passenger device 108 or the second passenger 106 via the second passenger device 112, respectively. Accordingly, the vehicle control system 102 and the vehicle maneuver manager 110 are described herein as having at least some redundant functionality to facilitate such processing capabilities.

Figure 2:
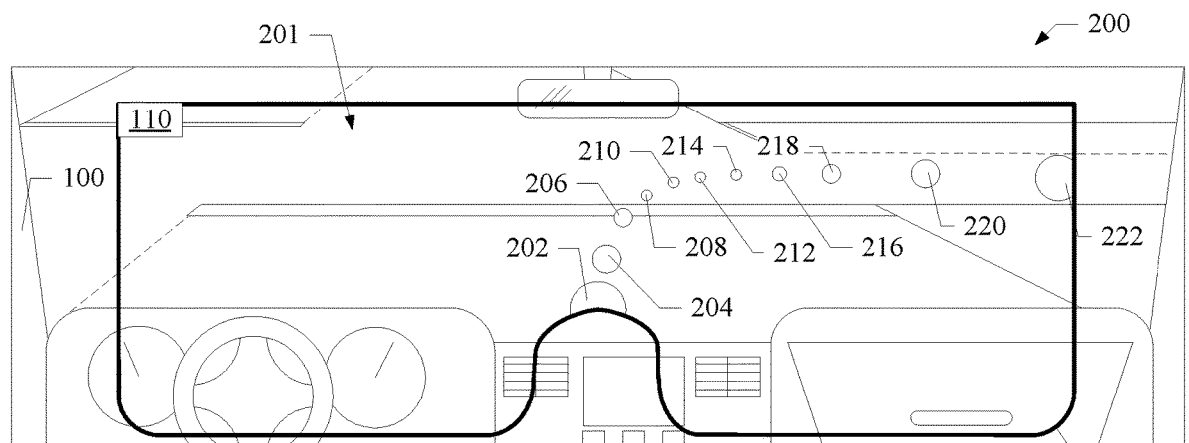
FIG. 2 is an example illustration of a first environment viewed through a first one of the passenger devices of FIG. 1.

FIG. 2 is an example illustration of a first environment 200 and a second environment 201, in which the second environment 201 corresponds to the first environment 200 as viewed through the first passenger device 108 of FIG. 1. As disclosed above, the first passenger device 108 includes the vehicle maneuver manager 110, as further described in connection with FIG. 7. The first passenger device 108 is an augmented reality wearable device, such as, for example, a device capable of displaying the second environment 201 including visual representations in spatial relation to the first environment 200. For example, the second environment 201 includes virtualized visual representations such as, for example, a first vehicle trajectory indicator 202, in connection with actual objects such as, for example, the interior of the vehicle 100 (e.g., the vehicle frame, dashboard, rearview mirror, etc.) and the environment 200 (e.g., road, intersection, curbs, grass, etc.). In the illustrated example of FIG. 2, the vehicle trajectory indicator 202 is displayed on the first passenger device 108 by the vehicle maneuver manager 110.

The first vehicle trajectory indicator 202 is illustrated as an incomplete circle in the illustrated example of FIG. 2 to illustrate that a portion of the first vehicle trajectory indicator 202 is outside the perspective of the first passenger device 108. However, because the first vehicle trajectory indicator 202 is an augmented reality notification displayed by an AR device, a user (e.g., the first passenger 104) can change his or her perspective to bring the entire first vehicle trajectory indicator 202 (e.g., a full circle) into his or her perspective. In such examples, the first vehicle trajectory indicator 202 remains static relative to objects in the environment 200 to give the illusion that the vehicle trajectory indicator 202 is in a physical location. While the first vehicle trajectory indicator 202 is represented as a circle (e.g., partial or full), any other shape or visual representation may be used. As disclosed herein, the displayed shapes or visual representations provide visual information to a passenger of a vehicle of which the passenger of the vehicle would be otherwise unaware.

The vehicle maneuver manager 110 presents a plurality of vehicle trajectory indicators on the first passenger device 108 including the first vehicle trajectory indicator 202, a second vehicle trajectory indicator 204, a third vehicle trajectory indicator 206, a fourth vehicle trajectory indicator 208, a fifth vehicle trajectory indicator 210, a sixth vehicle trajectory indicator 212, a seventh vehicle trajectory indicator 214, an eighth vehicle trajectory indicator 216, a ninth vehicle trajectory indicator 218, a tenth vehicle trajectory indicator 220, and an eleventh vehicle trajectory indicator 222. The vehicle maneuver manager 110 presents the plurality of vehicle trajectory indicators 202-222 in various sizes and/or shapes in relation to objects in the first environment 200 to create the illusion that the plurality of vehicle trajectory indicators 202 are located at various distances from the vehicle 100, as further discussed below in connection with FIGS. 2-4. In some examples, size is an indication of distance and/or vehicle speed variations.

As illustrated in FIG. 2, the vehicle trajectory indicators 202-222 are a visual representation of an anticipated right turn of the vehicle 100. For example, the first vehicle trajectory indicator 202, the second vehicle trajectory indicator 204, the third vehicle trajectory indicator 206, and the fourth vehicle trajectory indicator 208 are representative of an anticipated path of the vehicle 100 decelerating in preparation of a right turn. To represent deceleration of the vehicle 100, the vehicle maneuver manager 110 displays the first vehicle trajectory indicator 202 as larger in size than the second vehicle trajectory indicator 204, the second vehicle trajectory indicator 204 as larger in size than the third vehicle trajectory indicator 206, and the third vehicle trajectory indicator 206 as larger in size than the fourth vehicle trajectory indicator 208. The vehicle maneuver manager 110 may present other visual representation information to indicate deceleration of the vehicle, such as for example, a shape (e.g., octagons correspond to deceleration), color (e.g., red corresponds to deceleration), converging lines, a phantom visual representation of the vehicle 100 decelerating, etc.

Additionally, the vehicle maneuver manager 110 displays the first vehicle trajectory indicator 202, the second vehicle trajectory indicator 204, the third vehicle trajectory indicator 206, and the fourth vehicle trajectory indicator 208 to create the illusion that the first vehicle trajectory indicator 202, the second vehicle trajectory indicator 204, the third vehicle trajectory indicator 206, and the fourth vehicle trajectory indicator 208 are located at increasing distances from the vehicle 100. In some examples, the first vehicle trajectory indicator 202, the second vehicle trajectory indicator 204, the third vehicle trajectory indicator 206, and the fourth vehicle trajectory indicator 208 correspond to locations of where the vehicle 100 will be at a particular time. For example, the first vehicle trajectory indicator 202, the second vehicle trajectory indicator 204, the third vehicle trajectory indicator 206, and the fourth vehicle trajectory indicator 208 may represent the location of where the vehicle 100 will be at one-second intervals from its current location and time. Accordingly, the vehicle maneuver manager 110 displays, to a passenger, a decrease of vehicle speed over time (e.g., deceleration). The plurality of vehicle trajectory indicators may be spaced at equal or unequal intervals that are greater than or less than one second.

The fourth vehicle trajectory indicator 208, the fifth vehicle trajectory indicator 210, the sixth vehicle trajectory indicator 212, and the seventh vehicle trajectory indicator 214 are representative of an anticipated path of the vehicle changing direction. To represent direction change of the vehicle 100, the vehicle maneuver manager 110 displays the fourth vehicle trajectory indicator 208, the fifth vehicle trajectory 210, the sixth vehicle trajectory indicator 212, and the seventh vehicle trajectory indicator 214 as the same size, but spatially displaced to the right of the current direction of travel of the vehicle 100.

The eighth vehicle trajectory indicator 216, the ninth vehicle trajectory indicator 218, the tenth vehicle trajectory indicator 220, and the eleventh vehicle trajectory indicator 222 are representative of an anticipated path of the vehicle 100 accelerating out of the right turn. To represent acceleration of the vehicle 100, the vehicle maneuver manager 110 displays the eighth vehicle trajectory indicator 216 as smaller in size than the ninth vehicle trajectory indicator 218, the ninth vehicle trajectory indicator 218 as smaller in size than the tenth vehicle trajectory indicator 220, and the tenth vehicle trajectory indicator 220 as smaller in size than the eleventh vehicle trajectory indicator 222. The vehicle maneuver manager 110 may present other visual representation information to indicate acceleration of the vehicle, such as for example, color (e.g., green for acceleration), a phantom visual representation of the vehicle 100 accelerating, etc.

Additionally, the vehicle maneuver manager 110 displays the eighth vehicle trajectory indicator 216, the ninth vehicle trajectory indicator 218, the tenth vehicle trajectory indicator 220, and the eleventh vehicle trajectory indicator 222 at increasing distances from the vehicle 100. In some examples, the eighth vehicle trajectory indicator 216, the ninth vehicle trajectory indicator 218, the tenth vehicle trajectory indicator 220, and the eleventh vehicle trajectory indicator 222 are locations of where the vehicle 100 will be at a particular time. For example, the eighth vehicle trajectory indicator 216, the ninth vehicle trajectory indicator 218, the tenth vehicle trajectory indicator 220, and the eleventh vehicle trajectory indicator 222 may represent the location of the vehicle 100 at one-second intervals. Accordingly, the vehicle maneuver manager 110 displays, to a passenger, an increase of vehicle speed over time (e.g., acceleration). The plurality of vehicle trajectory indicators may be spaced at equal or unequal intervals that are greater than or less than one-second.

Figure 3:
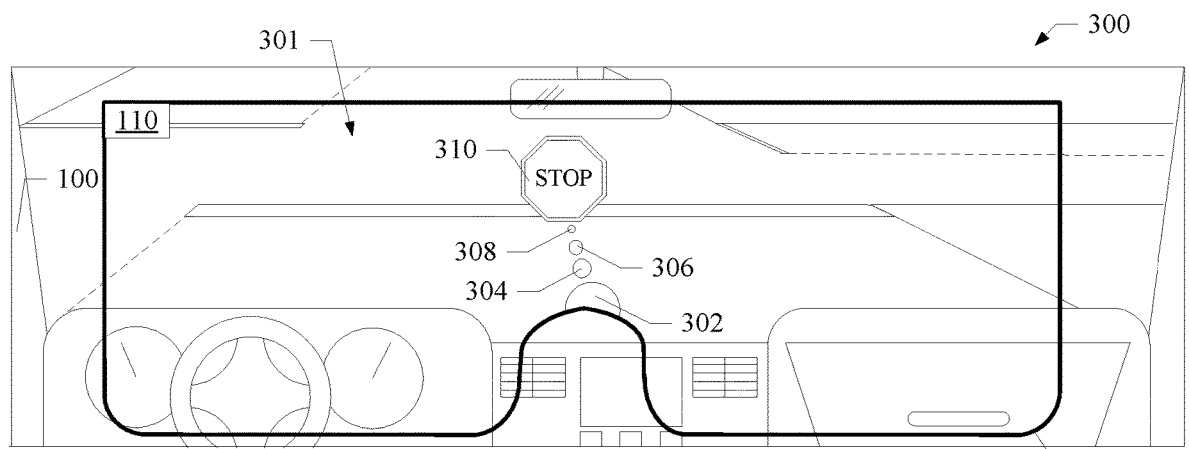
FIG. 3 is an example illustration of a second environment viewed through the first one of the passenger devices of FIG. 1.

FIG. 3 is an example illustration of a third environment 300 and a fourth environment 301, in which the fourth environment 301 corresponds to the third environment 300 as viewed through the first passenger device 108 of FIG. 1. The vehicle maneuver manager 110 presents a plurality of vehicle trajectory indicators on the first passenger device 108 including a first vehicle trajectory indicator 302, a second vehicle trajectory indicator 304, a third vehicle trajectory indicator 306, a fourth vehicle trajectory indicator 308, a stop indicator 310. The indicators 302-310 are a visual representation of the vehicle 100 coming to a complete stop.

As discussed in connection with FIG. 2, the vehicle maneuver manager 110 displays the first vehicle trajectory indicator 302 as larger in size than the second vehicle trajectory indicator 304, the second vehicle trajectory indicator 304 as larger in size than the third vehicle trajectory indicator 306, the third vehicle trajectory indicator 306 as larger in size than the fourth vehicle trajectory indicator 308, and displays the first vehicle trajectory indicator 302, the second vehicle trajectory indicator 304, the third vehicle trajectory indicator 306, and the fourth vehicle trajectory indicator 308 at increasing distances from the vehicle 100 to represent deceleration of the vehicle 100. The vehicle maneuver manager 110 displays the stop indicator 310 at a location associated with the anticipated stopping location of the vehicle 100. While the stop indicator 310 is illustrated as a stop sign, other visual representations may be used such that the passenger can visually identify the location where the vehicle 100 will stop.

Figure 4:
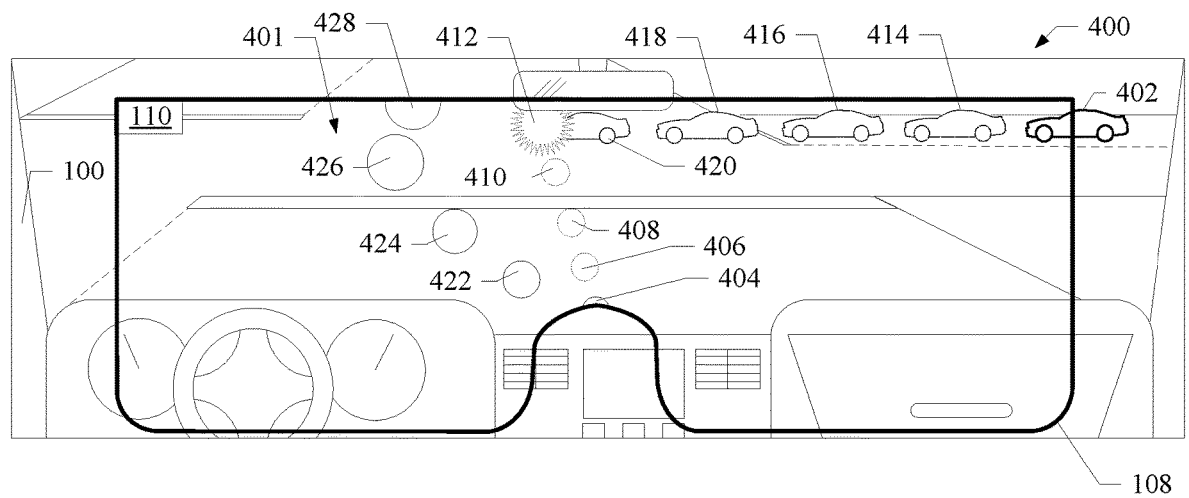
FIG. 4 is an example illustration of a third environment viewed through the first one of the passenger devices of FIG. 1.

FIG. 4 is an example illustration of a fifth environment 400 and a sixth environment 401, in which the sixth environment 401 corresponds to the fifth environment 400 as viewed through the first passenger device 108 of FIG. 1. The fifth environment 400 includes a second vehicle 402 traveling along a trajectory that could potentially lead to a collision with the vehicle 100. The vehicle maneuver manager 110 presents a plurality of vehicle trajectory indicators on the first passenger device 108 including a first vehicle trajectory indicator 404, a second vehicle trajectory indicator 406, a third vehicle trajectory indicator 408, a fourth vehicle trajectory indicator 410, and a collision indicator 412. The indicators 404-412 are a visual representation of the vehicle 100 maintaining its current trajectory and potentially colliding with the second vehicle 402.

For example, the vehicle maneuver manager 110 presents anticipated maneuvers of the second vehicle 402 and the vehicle 100. Based on the trajectory of the second vehicle 402, the vehicle maneuver manager 110 presents a plurality of second vehicle trajectory indicators 414-420 on the first passenger device 108 ending at the collision indicator 412. Accordingly, the vehicle maneuver manager 110 presents a potential collision to the passengers of the vehicle 100.

However, the vehicle maneuver manager 110 presents a sixth vehicle trajectory indicator 422, a seventh vehicle trajectory indicator 424, an eighth vehicle trajectory indicator 426, and a ninth vehicle trajectory indicator 428 representative of the vehicle 100 evading the potential collision with the second vehicle 402. For example, the vehicle maneuver manager 110 presents a representation of the vehicle 100 accelerating and evading the potential collision by veering to the left of the current trajectory. The vehicle maneuver manager 110 presents the sixth vehicle trajectory indicator 422, the seventh vehicle trajectory indicator 424, the eighth vehicle trajectory indicator 426, and the ninth vehicle trajectory indicator 428 with solid lines as representative of the current anticipated maneuver of the vehicle 100 based on current information. Thus, the vehicle maneuver manager 110 presents the indicators 404-410 with dotted lines as representative of a non-selected, but potential, maneuver of the vehicle 100.

Additionally or alternatively, the vehicle maneuver manager 110 may present other potential maneuvers, such as the right turn of FIG. 2, the abrupt stop of FIG. 3, pulling the vehicle 100 over to the side of the road, etc. to evade the potential collision. The current anticipated maneuver may be selected based on any number of statistical analyses, such as, for example, which maneuver has a highest probability of safe completion. The vehicle maneuver manager 110 may change the current anticipated maneuver of the vehicle (e.g., change dotted lines to solid lines) as additional information is acquired, statistical analysis of potential outcomes are determined, etc. However, the passengers of the vehicle 100 are informed of each anticipated vehicle maneuver (e.g., including the current anticipated vehicle maneuver) of the vehicle so that the passengers can prepare accordingly.

In some examples, the vehicle maneuver manager 110 may request a passenger to confirm or select an anticipated maneuver from a plurality of potential maneuvers. For example, the vehicle maneuver manager 110 may not have enough gathered information to determine a maneuver with a high probability of safe completion. In such examples, the vehicle maneuver manager 110 may notify a passenger that interaction is required for the vehicle 100 to continue autonomous operation. While the description in connection with FIGS. 2-4 references AR devices, the presentation of vehicle maneuvers discussed in connection with FIGS. 2-4 may also be applicable to mobile devices.

Figure 5:
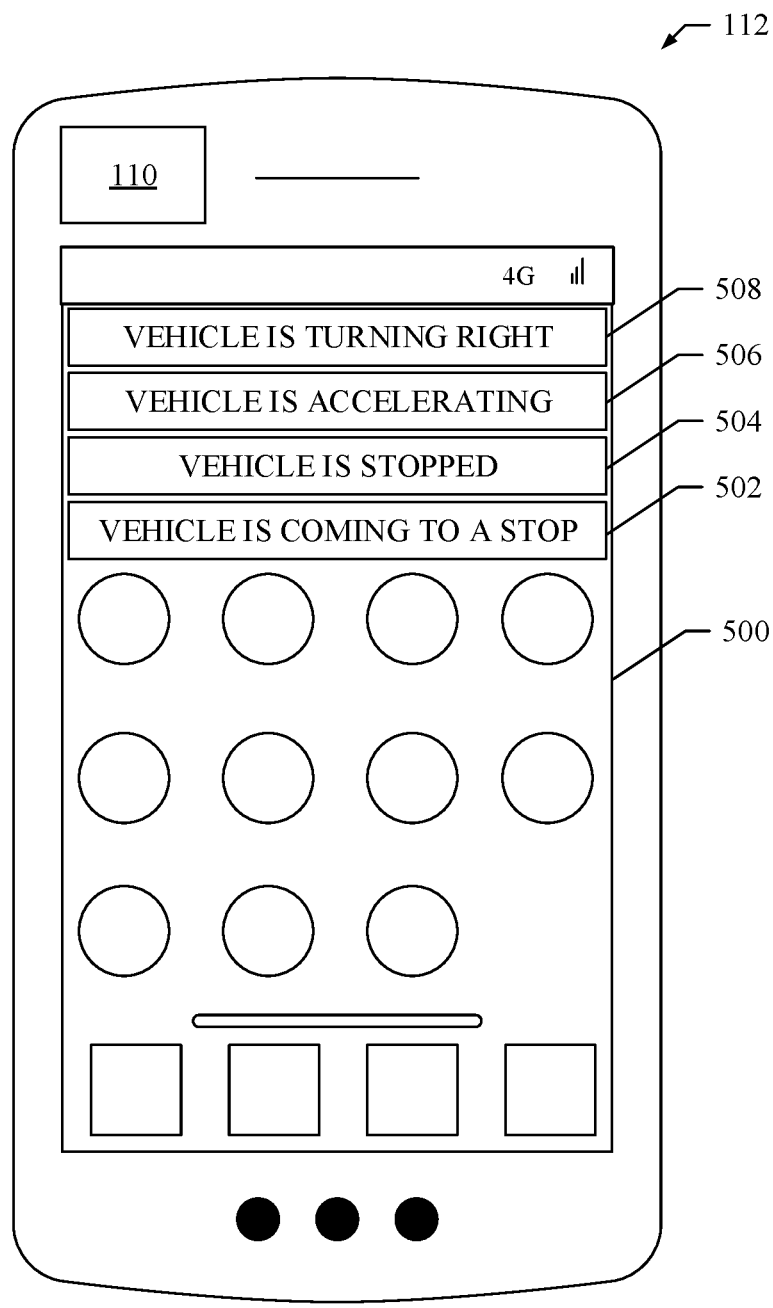
FIG. 5 is an example illustration of a second one of the passenger devices of FIG. 1.

FIG. 5 is an example illustration of the second passenger device 112 of FIG. 1. In the illustrated example of FIG. 5, the second passenger device 112 is a mobile device (e.g., a smart phone) with the vehicle maneuver manager 110 and a display 500 to present anticipated maneuvers to a passenger such as, for example, the second passenger 106. In some examples, the second passenger device 112 is incapable of AR. In some examples, the second passenger device 112 is infrequently facing the direction of travel, such that a visual representation of the anticipated vehicle maneuver may not be presented in spatial relation to the environment in front of the vehicle. For example, the second passenger 106 may be browsing the Internet because the second passenger 106 need not pay attention to the driving of the autonomous vehicle 100. In such examples, the vehicle maneuver manager 110 presents notifications 502-508 associated with the anticipated vehicle maneuvers on the display 500 of the second passenger device 112.

For example, if the autonomous vehicle is coming to a stop, the vehicle maneuver manager 110 presents notification 502. If the autonomous vehicle is stopped, the vehicle maneuver manager 110 presents notification 504. If the autonomous vehicle is to accelerate, the vehicle maneuver manager 110 presents notification 506. If the autonomous vehicle is going to turn right, the vehicle maneuver manager 110 presents notification 508. The vehicle maneuver manager 110 may pair the notifications 502-508 on the display 500 of the second passenger device 112 with haptic feedback (e.g., vibrations) and/or audio. The vehicle maneuver manager 110 may include varying levels of notification such as increasing volume of audio or increasing haptic feedback as an anticipated maneuver becomes imminent.

Figure 6:
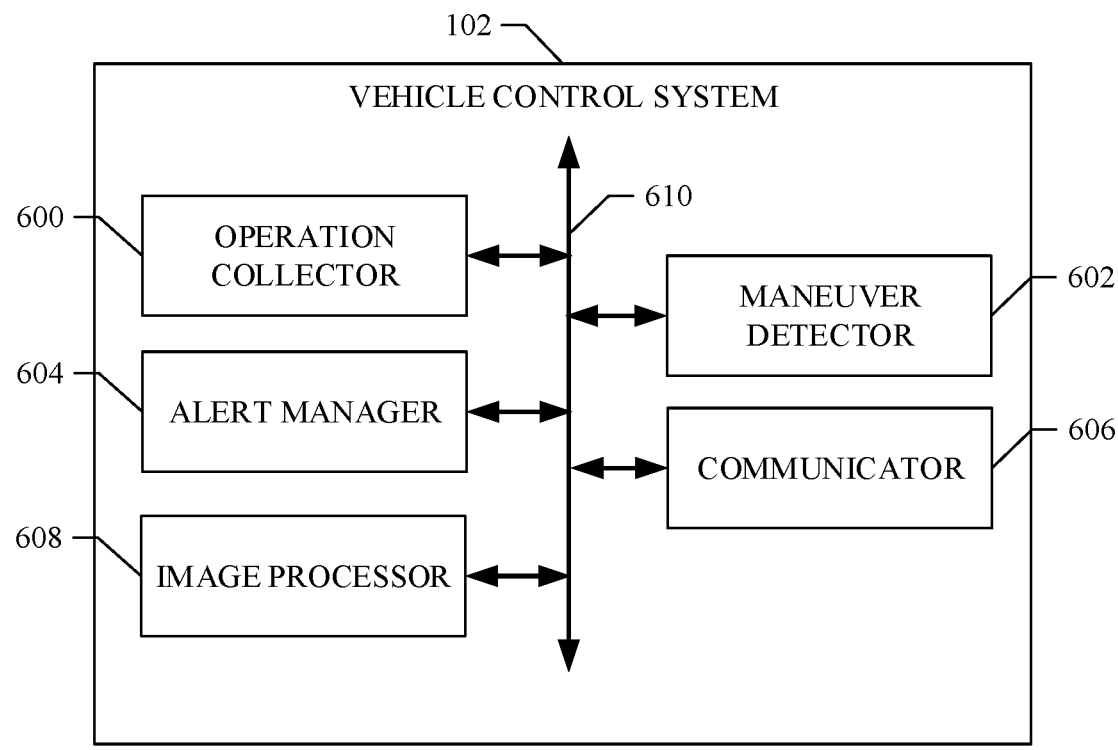
FIG. 6 is an example illustration of the vehicle control system of FIG. 1.
Figure 7:
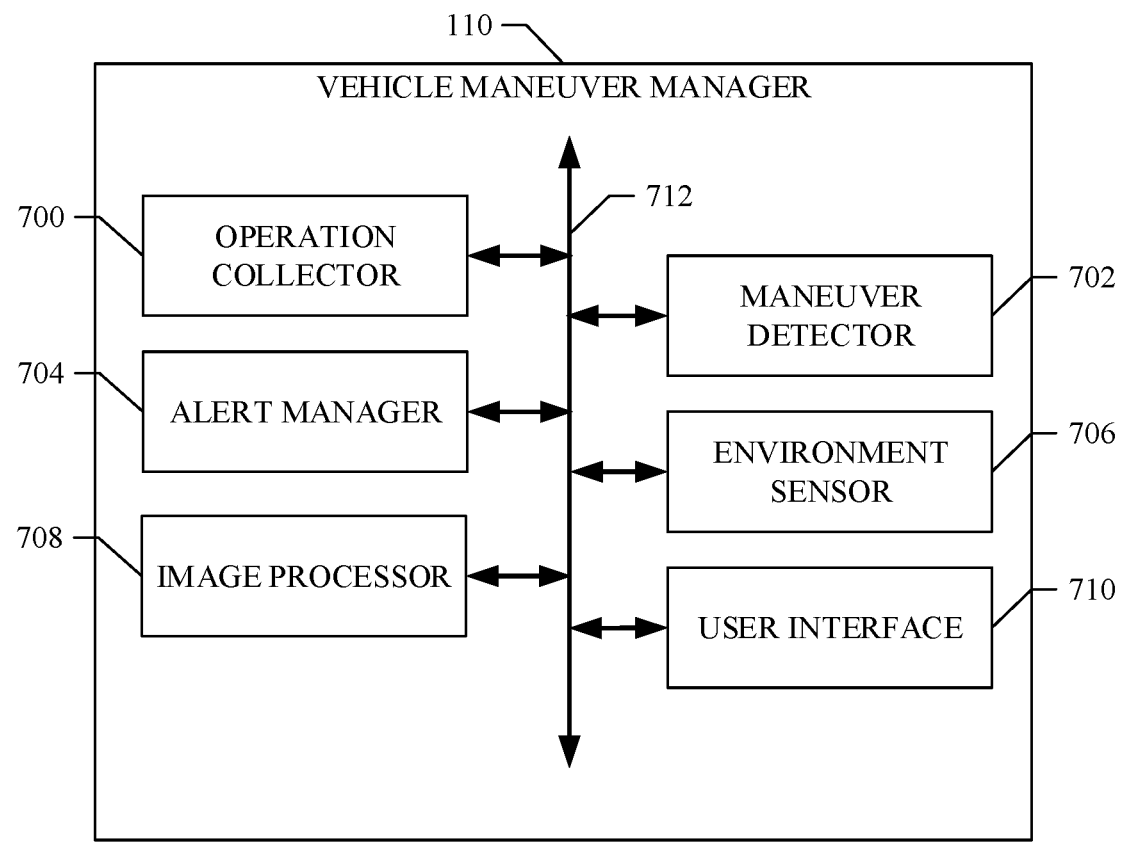
FIG. 7 is an example illustration of the vehicle maneuver manager of FIG. 1.

FIG. 6 is an example illustration of the vehicle control system 102 of FIG. 1. FIG. 7 is an example illustration of the vehicle maneuver manager 110 of FIGS. 1-5. As disclosed above, the majority of the processing required to determine anticipated vehicle maneuvers based on vehicle and environment characteristics is performed by the vehicle control system 102, by the vehicle maneuver manager 110, or any combination thereof.

The vehicle control system 102 of FIG. 6 includes an operation collector 600, a maneuver detector 602, an alert manager 604, a communicator 606, and an image processor 608. The operation collector 600, the maneuver detector 602, the alert manager 604, the communicator 606, and the image processor 608 are commutatively coupled via a bus 610. The vehicle maneuver manager 110 of FIG. 7 includes an operation collector 700, a maneuver detector 702, an alert manager 704, environment sensor(s) 706, an image processor 708, and a user interface 710. The operation collector 700, the maneuver detector 702, the alert manager 704, the environment sensor(s) 706, the image processor 708, and the user interface 710 are communicatively coupled via a bus 712.

The operation collector 600 collects information corresponding to autonomous operation of the vehicle 100. For example, the operation collector 600 collects the outputs of various vehicle controllers and/or sensors such as, for example, a speedometer, a global positioning system ("GPS"), navigation system, or external vehicle sensors (e.g., radar, sonar, cameras, infrared, etc.). The operation collector 600 collects information such as, for example, navigation route, acceleration, deceleration, lane changes, proximity to other vehicles, speed and/or trajectory of other vehicles, road conditions, foreign objects on roads, traffic cones, traffic signals/signs, and/or other data relating to operation of the vehicle 100. In some examples, the operation collector 600 collects information from an on-board computer in control of the autonomous operation of the vehicle 100.

The maneuver detector 602 determines an anticipated maneuver of the vehicle 100 based on the information collected by the operation collector 600. For example, if the operation collector 600 identifies a pothole in the middle of the road (e.g., a road condition), the maneuver detector 602 determines the vehicle 100 will evade the pothole (e.g., object evasion). Example vehicle maneuvers include, without limitation, turning/changing direction, changing lanes, stopping, accelerating, decelerating, honking, pulling over, passing, merging, object evading, veering, exiting, parking, reversing, etc. In some examples, the operation collector 600 collects information pertaining to anticipated vehicle maneuvers directly from the on-board computer of the vehicle 100. In such examples, the maneuver detector 602 prepares the information of the anticipated vehicle maneuver for use by the alert manager 604, the communicator 606, and/or the image processor 608, as further disclosed herein.

The alert manager 604 of the vehicle control system 102 communicates with the alert manager 704 (FIG. 7) of the vehicle maneuver manager 110 to determine a type of the passenger device in which the vehicle maneuver manager 110 is disposed. For example, the alert manager 604 receives information regarding whether the passenger device is an AR device, a non-AR device, or another presentation device (e.g., the windshield on the vehicle 100, a heads up display for the windshield of the vehicle 100, a navigation screen of the vehicle 100, a headrest monitor/display in the vehicle 100, etc.) from the alert manager 704 of the vehicle maneuver manager 110. Based on the device type, the alert manager 604 determines a notification type. For example, the alert manager 604 determines that augmented reality notifications, text notifications, audio notifications, and/or haptic feedback notifications are applicable to AR devices. In some examples, the alert manager 604 determines that text notifications, audio notifications, and/or haptic feedback notifications are applicable to non-AR devices.

In some examples, the alert manager 604 determines the notification type for AR devices based on an orientation of the AR device. For example, AR notifications of vehicle maneuvers are most effective when a user of an AR device is paying attention to the environment outside and in front of the vehicle 100. The alert manager 604 communicates with the environment sensor(s) 706 (FIG. 7) of the vehicle maneuver manager 110 to determine the orientation of the AR device. For example, the alert manager 604 receives an indication of the orientation of the AR device from the environment sensor(s) 706 of the vehicle maneuver manager 110. If the AR device has a forward facing orientation, then the alert manager 604 determines AR notifications are appropriate. If the AR device does not have a forward facing orientation, then the alert manager 604 determines text, audio, and/or haptic feedback notifications are appropriate. The alert manager 604 instructs the image processor 608 to generate visual representations of anticipated vehicle maneuvers and instructs the communicator 606 to send visual representations, text notifications, audio notifications, and/or haptic feedback notifications to AR devices. The alert manager 604 instructs the communicator to send text notifications, audio notifications, and/or haptic feedback notifications to non-AR devices.

In some examples, the communicator 606 of the vehicle control system 102 sends information corresponding to operation of the vehicle 100 to the operation collector 700 (FIG. 7) of the vehicle maneuver manager 110. In some examples, the communicator 606 sends notifications to passenger devices based on the alert manager 604 and/or the image processor 608. The communicator 606 may utilize any number of communication protocols including, without limitation, Bluetooth, wireless local area network, cellular data, near-field communication, etc. In some examples, the communicator 606 may determine whether a passenger device is on, paired, or otherwise connected/connectable prior to sending notifications.

The image processor 608 generates visual representations of the determined vehicle maneuvers. For example, in FIG. 2 the image processor 608 generates a visual representation indicating that the vehicle 100 is about to make a right turn. In the illustrated example of FIG. 3, the image processor 608 generates a visual representation indicating that the vehicle 100 is about to stop. In the illustrated example of FIG. 4, the image processor 608 generates a visual representation indicating that the vehicle 100 is about to evade a potential collision with the second vehicle 402. In some examples, the image processor 608 generates the visual representations according to various techniques in augmented reality such that the visual representation is static relative to the environment during passenger movement.

The image processor 608 generates one or more vehicle trajectory indicators to visually illustrate the maneuver the vehicle is about to complete. In some examples, the image processor 608 represents the vehicle trajectory indicators as circles or spheres. However, the image processor 608 may represent the vehicle trajectory indicators by lines, squares, cubes, diamonds, phantom visual representations of the vehicle 100, or any other graphical shape(s) or image(s). The image processor 608 may generate vehicle trajectory indicators in various sizes, shapes, and/or colors to provide a passenger with additional vehicle maneuver information such as, for example, acceleration, deceleration, complete stop, reverse, etc. The image processor 608 may separate the vehicle trajectory indicators by distance, time, or any other measurement. Additionally or alternatively, the image processor 608 may generate visual simulations of the vehicle 100 performing the anticipated maneuver prior to the vehicle 100 performing the maneuver.

The operation collector 700 communicates with the vehicle control system 102 to collect information corresponding to operation of the vehicle 100. For example, the operation collector 700 of the vehicle maneuver manager 110 receives information corresponding to operation of the vehicle 100 from the communicator 606 (FIG. 6) of the vehicle control system 102. In some examples, the operation collector 700 communicates with an on-board computer of the vehicle 100 to collect information corresponding to operation of the vehicle 100. In some examples, the operation collector 700 is in communication with all the vehicle sensors through which the operation collector 700 collects the information corresponding to operation of the vehicle 100. For example, the operation collector 700 collects the outputs of various vehicle controllers and/or sensors such as, for example, a speedometer, a GPS, navigation system, or external vehicle sensors (e.g., radar, sonar, cameras, infrared, etc.). The operation collector 700 collects information such as, for example, navigation route, acceleration, deceleration, lane changes, proximity to other vehicles, speed and/or trajectory of other vehicles, road conditions, foreign objects on roads, traffic cones, traffic signals/signs, and/or other data relating to operation of the vehicle 100.

The maneuver detector 702 determines an anticipated maneuver of the vehicle 100 based on the information collected by the operation collector 700. For example, if the operation collector 700 identifies a pothole in the middle of the road (e.g., a road condition), the maneuver detector 702 determines that the vehicle 100 will evade the pothole. In some examples, the on-board computer of the vehicle 100 determines a vehicle maneuver (e.g., evade the pothole) and communicates this to the maneuver detector 702. In such examples, the maneuver detector 702 prepares the information of the anticipated vehicle maneuver for use by the alert manager 704, the image processor 708, and the user interface 710 as further disclosed herein. Example vehicle maneuvers include, without limitation, turning, changing lanes, stopping, accelerating, decelerating, honking, pulling over, passing, merging, object evading, veering, exiting, parking, reversing, etc.

The alert manager 704 determines a type of the passenger device in which the vehicle maneuver manager 110 is disposed. For example, the alert manager 704 determines whether the passenger device is an AR device, a non-AR device, or another computing device. Based on the device type, the alert manager 704 determines a notification type. For example, the alert manager 704 determines that augmented reality notifications, text notifications, audio notifications, and/or haptic feedback notifications are applicable to AR devices. In such examples, the alert manager 704 instructs the user interface 710 to present augmented reality notifications, text notifications, audio notifications, and/or haptic feedback notifications on AR devices. In some examples, the alert manager 704 determines that text notifications, audio notifications, and/or haptic feedback notifications are applicable to non-AR devices. In such examples, the alert manager 704 instructs the user interface 710 to present text notifications, audio notifications, and/or haptic feedback notifications on non-forward facing AR device and non-AR devices.

In some examples, the alert manager 704 determines the notification type for AR devices based on an orientation of the AR device. For example, AR notifications of vehicle maneuvers are most effective when a user of an AR device is paying attention to the environment in front of the vehicle 100. The alert manager 704 communicates with the environment sensor(s) 706 to determine the orientation of the AR device. If the AR device has a forward facing orientation, then the alert manager 704 determines AR notifications are appropriate. The alert manager 704 instructs the image processor 708 to generate visual representations of anticipated vehicle maneuvers for AR devices with forward facing perspectives. If the AR device does not have a forward facing orientation, then the alert manager 704 determines text, audio, and/or haptic feedback notifications are appropriate.

The environment sensor(s) 706 acquires environment characteristics with which to juxtapose the visual representation of the vehicle maneuver to create an augmented reality notification. Example environment sensors include, without limitation, cameras, accelerometers, radio frequency identifier ("RFID") scanners, etc. In some examples, the environment sensor(s) 706 senses the environment that a passenger using the passenger device would see such that the user interface 710 can overlay the visual representation of the vehicle maneuver generated by the image processor 708 in spatial relation with that environment, created an augmented reality experience. In some examples, the environment sensor(s) 706 determines a perspective of a passenger using the passenger device. For example, the environment sensor(s) 706 (e.g., a camera, RFID scanner, etc.) attempts to detect markers in the front of the vehicle 100, the windshield of the vehicle 100 based on the size, shape, and/or position, the rearview mirror of the vehicle 100 based the size, shape, position, and reflectivity, or other identifying features related to the front of the vehicle 100 to determine whether the device has a forward facing perspective.

In some examples, the environment sensor(s) 706 may detect that the environment that a passenger would see has not changed for a threshold amount of time and determine the passenger is not looking at the environment in front of the vehicle 100 (e.g., the environment in front of the vehicle 100 would change as the vehicle 100 moves). In some examples, the environment sensor(s) 706 may detect acceleration forces upon different axes of the environment sensor(s) 706 (e.g., acceleration of gravity, acceleration/deceleration of the vehicle, etc.) to determine the perspective of the passenger device. In some examples, when the passenger device is not in a forward facing perspective, one or more of the environment sensor(s) 706 (e.g., cameras) may be turned off to save power. In some such examples, the one or more of the environment sensor(s) 706 are turned on when the passenger device returns to a forward facing perspective.

The image processor 708 generates a visual representation of the vehicle maneuver. As illustrated in FIG. 2, the image processor 708 may generate a visual representation that the vehicle 100 is about to make a right turn. As illustrated in FIG. 3, the image processor 708 may generate a visual representation that the vehicle 100 is about to stop. As illustrated in FIG. 4, the image processor 708 may generate a visual representation that the vehicle 100 is about to evade a potential collision with the second vehicle 402. In some examples, the image processor 708 generates the visual representations accordingly to various techniques in augmented reality such that the visual representation is static relative to the environment during passenger movement.

The image processor 708 generates one or more vehicle trajectory indicators to visually illustrate the maneuver the vehicle is about to complete. In some examples, the image processor 708 represents the vehicle trajectory indicators with circles or spheres. However, the image processor 708 may represent the vehicle trajectory indicators by lines, squares, cubes, diamonds, a phantom visual representation of the vehicle 100, or any other shape(s). The image processor 708 may generate vehicle trajectory indicators in various sizes, shapes, and/or colors to provide a passenger with additional vehicle maneuver information such as, for example, acceleration, deceleration, complete stop, reverse, etc. The image processor 708 may separate the vehicle trajectory indicators by projected distance, time, or any other measurement. Additionally or alternatively, the image processor 708 may generate visual simulations of the vehicle 100 performing the anticipated maneuver prior to the vehicle 100 performing the maneuver.

The user interface 710 presents the notification of the anticipated maneuver determined by the operation collector 700, the maneuver detector 702, the alert manager 704, the environment sensor(s) 706, and/or the image processor 708. In some examples, the user interface 710 is a display such as, for example, a display screen on an AR wearable device (e.g., Google Glass™, Microsoft Hololens™, etc.), a mobile device display, the windshield of the vehicle 100, a heads up display for the windshield of the vehicle 100, a navigation screen of the vehicle 100, a headrest monitor/display in the vehicle 100, etc. The user interface 710 presents notifications of anticipated maneuvers such as, for example, turning, changing lanes, stopping, accelerating, decelerating, honking, pulling over, passing, merging, object evading, veering, exiting, parking, reversing, etc. In some examples, additional notifications such as, for example, a vehicle state, user confirmation/selection, destination arrival, vehicle shut off, vehicle ignition, etc. may be presented in combination with, after, or lieu of a maneuver notification such as, for example, stopping. Such additional notifications may further alert inattentive passengers.

In operation, either the vehicle control system 102 or the vehicle maneuver manager 110 can perform processing of the anticipated vehicle maneuvers. In examples to extend the battery life of mobile applications, the vehicle control system 102 performs the bulk of the processing such as, for example, collecting information corresponding to the operation of the autonomous vehicle 100, determining the vehicle maneuver based on the collected information, determining the notification type based on the connected passenger devices within the vehicle, and/or generating the visual representation of the vehicle maneuver. In such examples, the communicator 606 of the vehicle control system 102 pushes the output of such processing to the vehicle maneuver manager 110 for presentation of the same. Alternatively, the vehicle maneuver manager 110 collects information corresponding to the operation of the autonomous vehicle 100, determines the vehicle maneuver based on the collected information, determines the notification type based on the passenger device, generates the visual representation of the vehicle maneuver, and/or presents the notification to the passenger.

While an example manner of implementing the vehicle control system 102 of FIG. 1 is illustrated in FIG. 6, one or more of the elements, processes and/or devices illustrated in FIG. 6 may be combined, divided, re-arranged, omitted, eliminated and/or implemented in any other way. While an example manner of implementing the vehicle maneuver manager 110 of FIGS. 1-5 is illustrated in FIG. 7, one or more of the elements, processes and/or devices illustrated in FIG. 7 may be combined, divided, re-arranged, omitted, eliminated and/or implemented in any other way. Further, the operation collector 600, the maneuver detector 602, the alert manager 604, the communicator 606, the image processor 608 and/or, more generally, the vehicle control system 102 of FIG. 1; and/or the operation collector 700, the maneuver detector 702, the alert manager 704, the environment sensor(s) 706, the image processor 708, the user interface 710, and/or, more generally, the vehicle maneuver manager 110 of FIGS. 1-5 may be implemented by hardware, software, firmware and/or any combination of hardware, software and/or firmware. Thus, for example, any of the operation collector 600, the maneuver detector 602, the alert manager 604, the communicator 606, the image processor 608 and/or, more generally, the vehicle control system 102 of FIG. 1; and/or the operation collector 700, the maneuver detector 702, the alert manager 704, the environment sensor(s) 706, the image processor 708, the user interface 710, and/or, more generally, the vehicle maneuver manager 110 of FIGS. 1-5 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the operation collector 600, the maneuver detector 602, the alert manager 604, the communicator 606, the image processor 608, the operation collector 700, the maneuver detector 702, the alert manager 704, the environment sensor(s) 706, the image processor 708, or the user interface 710 is/are hereby expressly defined to include a tangible computer readable storage device or storage disk such as a memory, a digital versatile disk (DVD), a compact disk (CD), a Blu-ray disk, etc. storing the software and/or firmware. Further still, the vehicle control system 102 of FIG. 1 and/or the vehicle maneuver manager 110 of FIGS. 1-5 may include one or more elements, processes and/or devices in addition to, or instead of, those illustrated in FIGS. 6-7, and/or may include more than one of any or all of the illustrated elements, processes and devices.

Figure 8:
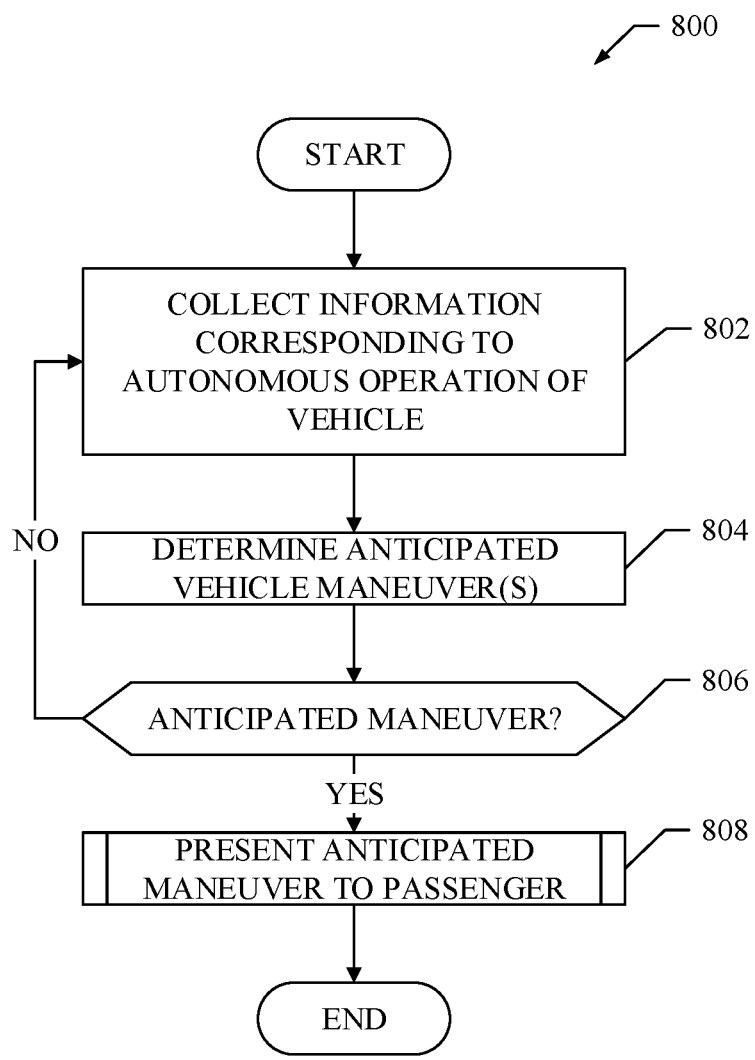
FIGS. 8-9 are flowcharts representative of example methods that may be performed to implement the vehicle maneuver manager of FIG. 7.
Figure 9:
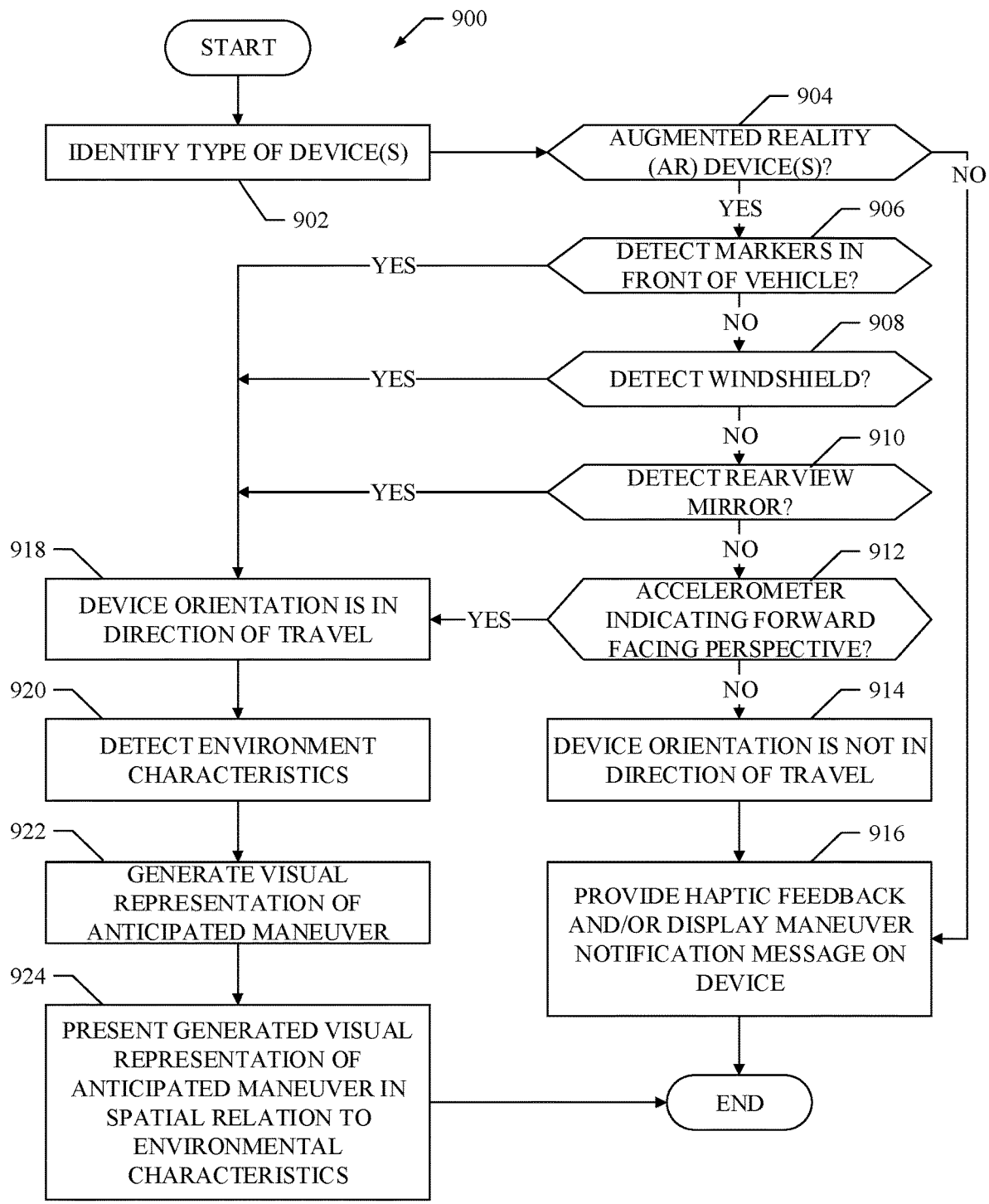

Flowcharts representative of example methods for implementing the vehicle control system 102 of FIG. 6 and/or the vehicle maneuver manager 110 of FIG. 7 are shown in FIGS. 8-9. In some examples, the methods may be implemented using machine-readable instructions that comprise programs for execution by a processor such as the processor 1012 shown in the example processor platform 1000 discussed below in connection with FIG. 10. The programs may be embodied in software stored on a tangible computer readable storage medium such as a CD-ROM, a floppy disk, a hard drive, a digital versatile disk (DVD), a Blu-ray disk, or a memory associated with the processor 1012, but the entire program and/or parts thereof could alternatively be executed by a device other than the processor 1012 and/or embodied in firmware or dedicated hardware. Further, although the example programs are described with reference to the flowcharts illustrated in FIGS. 8-9, many other methods of implementing the vehicle control system 102 and/or the vehicle maneuver manager 110 may alternatively be used. For example, the order of execution of the blocks may be changed, and/or some of the blocks described may be changed, eliminated, or combined.

As mentioned above, the methods of FIGS. 8-9 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and transmission media. As used herein, "tangible computer readable storage medium" and "tangible machine readable storage medium" are used interchangeably. Additionally or alternatively, the example methods of FIGS. 8-9 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and transmission media. As used herein, when the phrase "at least" is used as the transition term in a preamble of a claim, it is open-ended in the same manner as the term "comprising" is open ended. Comprising and all other variants of "comprise" are expressly defined to be open-ended terms. Including and all other variants of "include" are also defined to be open-ended terms. In contrast, the term consisting and/or other forms of consist are defined to be close-ended terms.

FIG. 8 is a flowchart representative of a method 800 that may be performed to implement the vehicle control system 102 of FIG. 6 and/or the vehicle maneuver manager 110 of FIG. 7. In a first configuration (e.g., battery saving configuration), blocks 802-806 are performed by the vehicle control system 102 and block 808 is performed by the vehicle maneuver manager 110. At block 802, the operation collector 600 of the vehicle control system 102 collects information corresponding to the autonomous operation of the vehicle 100. The maneuver detector 602 of the vehicle control system 102 determines anticipated vehicle maneuvers based on the information collected by the operation collector 600 (block 804). If the maneuver detector 602 determines an anticipated maneuver (block 806: YES), control proceeds to block 808. However, if the maneuver detector 602 does not determine an anticipated maneuver (block 806: NO), control returns to block 802. At block 808, the alert manager 704 of the vehicle maneuver manager 110 presents the anticipated maneuver to a user via the user interface 710 of the passenger device. Thereafter, the method 800 ceases.

In a second configuration, blocks 802-808 are performed by the vehicle maneuver manager 110. At block 802, the operation collector 700 of the vehicle maneuver manager 110 collects information corresponding to the autonomous operation of the vehicle 100. The maneuver detector 702 of vehicle maneuver manager 110 determines anticipated vehicle maneuvers based on the information collected by the operation collector 700 (block 804). If the maneuver detector 702 determines an anticipated maneuver (block 806: YES), control proceeds to block 808. However, if the maneuver detector 702 does not determine an anticipated maneuver (block 806: NO), control returns to block 802. At block 808, the alert manager 704 of the vehicle maneuver manager 110 presents the anticipated maneuver to a user via the user interface 710 of the passenger device. Thereafter, the method 800 ceases.

FIG. 9 is a flowchart representative of a method 900 that may be performed to implement the vehicle maneuver manager 110 of FIG. 7. In some examples, the method 900 is an example implementation of block 808 (FIG. 8). The method 900 begins at block 902. The alert manager 704 identifies the type of passenger device with which the vehicle maneuver manager 110 is associated. As disclosed herein, the vehicle maneuver manager 110 may be included in AR devices and non-AR devices. If the alert manager 704 determines the type of device is an AR device (block 904: YES), control proceeds to block 906.

At block 906, the environment sensor(s) 706 (e.g., a camera, RFID scanner, etc.) attempts to detect markers in the front of the vehicle 100 (e.g., disposed in the front windshield of the vehicle). If the environment sensor(s) 706 does not detect markers in the front of the vehicle 100 (block 906: NO), control proceeds to block 908.

At block 908, the environment sensor(s) 706 (e.g., a camera) attempts to detect the windshield of the vehicle 100 based on the size, shape, and/or position of the windshield. If the environment sensor(s) 706 does not detect the windshield of the vehicle 100 (block 908: NO), control proceeds to block 910.

At block 910, the environment sensor(s) 706 (e.g., a camera) attempts to detect the rearview mirror of the vehicle 100 based the size, shape, position, and reflectivity. If the environment sensor(s) 706 does not detect the rearview mirror of the vehicle 100 (block 910: NO), control proceeds to block 912.

At block 912, the environment sensor(s) 706 (e.g., an accelerometer, camera, RFID scanner, etc.) attempts to detect whether the passenger device has a forward facing perspective. If the environment sensor(s) 706 does not determine that the passenger device has a forward facing perspective (block 912: NO), control proceeds to block 914.

At block 914, the alert manager 704 determines that the AR device orientation is not in the direction of travel. Therefore, after block 914, or if the alert manager 704 determines the type of passenger device is not an augmented reality device (block 904: NO), control proceeds to block 916. At block 916, the alert manager 704 determines the notification type is haptic feedback and/or notification message display. The alert manager 704 instructs the user interface 710 to present, on the passenger device, haptic feedback and/or a notification message (e.g., text and/or audio) based on the anticipated maneuver determined at block 806 (FIG. 8). Thereafter, the method 900 ceases.

However, if the environment sensor(s) 706 detect markers in the front of the vehicle 100 (block 906: YES), if the environment sensor(s) 706 detect the windshield of the vehicle 100 (block 908: YES), if the environment sensor(s) 706 detect the rearview mirror of the vehicle 100 (block 910: YES), and/or if the environment sensor(s) 706 determines that the passenger device has a forward facing perspective (block 912: YES), control proceeds to block 918.

At block 918, the alert manager 704 determines the AR device orientation is in the direction of travel. The example described in FIG. 9 assumes a forward direction of travel. In some examples, the method 900 may be adapted to detect markers in the back of the vehicle 100, detect the rear window, determine a rearward facing perspective, etc., such that the methods and apparatus disclosed herein are equally applicable to autonomous vehicle operation in the reverse gear or movement in a rearward direction.

The environment sensor(s) 706 (e.g., a camera) detects environment characteristics outside of the vehicle 100 (block 920). In some examples, the image processor 708 of the vehicle maneuver manager 110 generates a visual representation of the anticipated maneuver determined at block 806 (FIG. 8) (block 922). Alternatively, the image processor 608 of the vehicle control system 102 generates the visual representation of the anticipated maneuver determined at block 806. At block 924, the alert manager 704 instructs the user interface 710 to present, on the passenger device, the visual representation generated at block 922 in spatial relation to the environment characteristics detected at block 920. Thereafter, the method 900 ceases.

Figure 10:
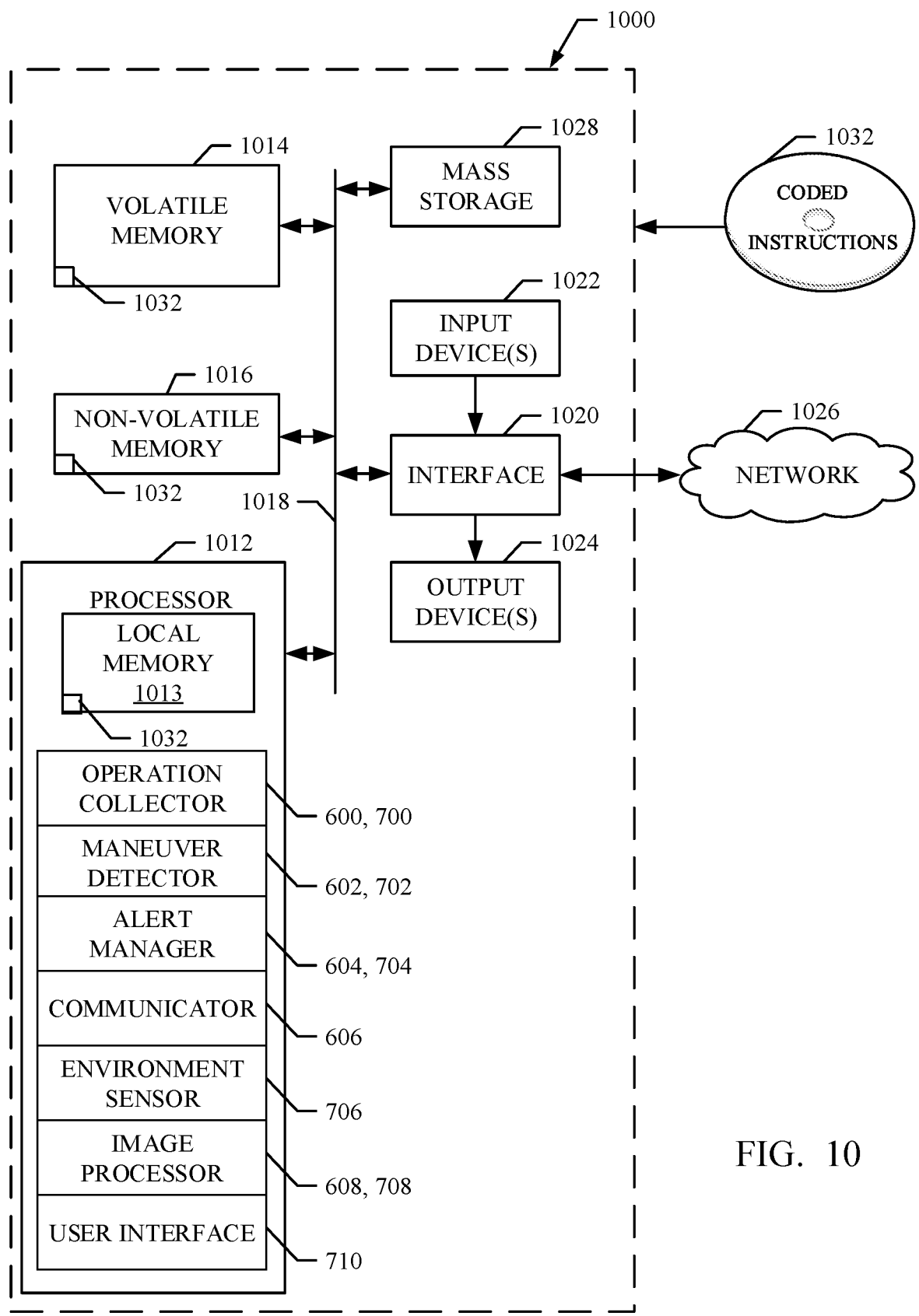
FIG. 10 a block diagram of a processor platform capable of executing machine-readable instructions to implement the methods of FIGS. 8-9 and the vehicle maneuver manager of FIG. 7.

FIG. 10 is a block diagram of an example processor platform 1000 capable of executing instructions to implement the methods of FIGS. 8-9 and the vehicle control system 102 of FIG. 6 and/or the vehicle maneuver manager 110 of FIG. 7. The processor platform 1000 can be, for example, an on-board computer of the vehicle 100, a personal computer, a mobile device (e.g., a cell phone, a smart phone, a tablet such as an iPad™), an AR device, a personal digital assistant (PDA), an Internet appliance, or any other type of computing device.

The processor platform 1000 of the illustrated example includes a processor 1012. The processor 1012 of the illustrated example is hardware. For example, the processor 1012 can be implemented by one or more integrated circuits, logic circuits, microprocessors or controllers from any desired family or manufacturer.

The processor 1012 of the illustrated example includes a local memory 1013 (e.g., a cache). The processor 1012 of the illustrated example is in communication with a main memory including a volatile memory 1014 and a non-volatile memory 1016 via a bus 1018. The volatile memory 1014 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1016 may be implemented by flash memory and/or any other desired type of memory device. Access to the main memory 1014, 1016 is controlled by a memory controller.

The processor platform 1000 of the illustrated example also includes an interface circuit 1020. The interface circuit 1020 may be implemented by any type of interface standard, such as an Ethernet interface, a universal serial bus (USB), and/or a PCI express interface.

In the illustrated example, one or more input devices 1022 are connected to the interface circuit 1020. The input device(s) 1022 permit(s) a user to enter data and commands into the processor 1012. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1024 are also connected to the interface circuit 1020 of the illustrated example. The output devices 1024 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), and/or speakers). The interface circuit 1020 of the illustrated example, thus, typically includes a graphics driver card, a graphics driver chip or a graphics driver processor.

The interface circuit 1020 of the illustrated example also includes a communication device such as a transmitter, a receiver, a transceiver, a modem and/or network interface card to facilitate exchange of data with external machines (e.g., computing devices of any kind) via a network 1026 (e.g., an Ethernet connection, a digital subscriber line (DSL), a telephone line, coaxial cable, a cellular telephone system, etc.).

The processor platform 1000 of the illustrated example also includes one or more mass storage devices 1028 for storing software and/or data. Examples of such mass storage devices 1028 include floppy disk drives, hard drive disks, compact disk drives, Blu-ray disk drives, RAID systems, and digital versatile disk (DVD) drives.

The coded instructions 1032 of FIGS. 8-9 may be stored in the mass storage device 1028, in the volatile memory 1014, in the non-volatile memory 1016, and/or on a removable tangible computer readable storage medium such as a CD or DVD.

From the foregoing, it will be appreciated that the above-disclosed methods, apparatus and articles of manufacture notify a passenger of anticipated maneuvers of an autonomous vehicle via one or more passenger devices. The notifications disclosed herein vary according to a device type including, without limitation, augmented reality display notification, text message notification, audio notification, and/or haptic feedback notifications. In some examples, the notifications vary according to an orientation of the passenger device.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus, comprising:
memory including machine-readable instructions; and
at least one processor to execute the instructions to:
   determine an anticipated autonomous maneuver of a vehicle based on the collected information corresponding to autonomous operation of the vehicle;
   determine whether a passenger device is an augmented reality (AR) device;
   determine whether the passenger device is oriented in a direction of travel of the vehicle;
   in response to determining that the passenger device is not an AR device or that the passenger device is not oriented in the direction of travel of the vehicle, instruct the passenger device to present at least one of haptic feedback or a notification message indicative of the anticipated autonomous maneuver; and
   in response to determining that the passenger device is an AR device oriented in the direction of travel of the vehicle:
      generate an AR-based visual representation of the anticipated autonomous maneuver; and
      instruct the passenger device to present the AR-based visual representation of the anticipated autonomous maneuver.

2. An apparatus as defined in claim 1, wherein the anticipated autonomous maneuver is at least one of acceleration, deceleration, stopping, object evasion, or a change of direction.

3. An apparatus as defined in claim 1, wherein the passenger device is a wearable AR device.

4. An apparatus as defined in claim 3, wherein the passenger device is to present the AR-based visual representation of the anticipated autonomous maneuver in AR via a user interface.

5. An apparatus as defined in claim 1, wherein the at least one processor, in response to determining that the passenger device is an AR device oriented in the direction of travel of the vehicle, is further to execute the instructions to:
   detect environment characteristics located outside of the vehicle; and
   instruct the passenger device to present the AR-based visual representation of the anticipated autonomous maneuver in spatial relation to the detected environment characteristics.

6. An apparatus as defined in claim 5, wherein the AR device is a wearable AR device, and the environment characteristics correspond to an environment visible to a passenger wearing the wearable AR device.

7. An apparatus as defined in claim 1, wherein the at least one processor is to determine whether the passenger device is oriented in a direction of travel of the vehicle by determining whether a marker disposed in a front windshield of the vehicle has been detected by a sensor of the passenger device.

8. An apparatus as defined in claim 1, wherein the at least one processor is to determine whether the passenger device is oriented in a direction of travel of the vehicle by determining whether a front windshield of the vehicle has been detected by a sensor of the passenger device.

9. An apparatus as defined in claim 1, wherein the at least one processor is to determine whether the passenger device is oriented in a direction of travel of the vehicle by determining whether a rearview mirror marker of the vehicle has been detected by a sensor of the passenger device.

10. A method, comprising:
  determining, by executing at least one instruction with at least one processor, an anticipated autonomous maneuver of a vehicle based on collected information corresponding to autonomous operation of the vehicle;
  determining, by executing at least one instruction with the at least one processor, whether a passenger device is an augmented reality (AR) device;
  determining, by executing at least one instruction with the at least one processor, whether the passenger device is oriented in a direction of travel of the vehicle;
  in response to determining that the passenger device is not an AR device or that the passenger device is not oriented in the direction of travel of the vehicle, instructing, by executing at least one instruction with the at least one processor, the passenger device to present at least one of haptic feedback or a notification message indicative of the anticipated autonomous maneuver; and
  in response to determining that the passenger device is an AR device oriented in the direction of travel of the vehicle:
    generating, by executing at least one instruction with the at least one processor, an AR-based visual representation of the anticipated autonomous maneuver; and
    instructing, by executing at least one instruction with the at least one processor, the passenger device to present the AR-based visual representation of the anticipated autonomous maneuver.

11. A method as defined in claim 10, wherein the anticipated autonomous maneuver is at least one of acceleration, deceleration, stopping, object evasion, or a change of direction.

12. A method as defined in claim 10, further comprising, in response to determining that the passenger device is an AR device oriented in the direction of travel of the vehicle:
  detecting environment characteristics located outside of the vehicle; and
  instructing the passenger device to present the AR-based visual representation of the anticipated autonomous maneuver in spatial relation to the detected environment characteristics.

13. A method as defined in claim 12, wherein the AR device is a wearable AR device, and the environment characteristics correspond to an environment visible to a passenger wearing the wearable AR device.

14. A method as defined in claim 10, wherein determining whether the passenger device is oriented in a direction of travel of the vehicle includes determining, by executing at least one instructions with the at least one processor, whether a marker disposed in a front windshield of the vehicle has been detected by a sensor of the passenger device.

15. A method as defined in claim 10, wherein determining whether the passenger device is oriented in a direction of travel of the vehicle includes determining, by executing at least one instructions with the at least one processor, whether a front windshield of the vehicle has been detected by a sensor of the passenger device.

16. A method as defined in claim 10, wherein determining whether the passenger device is oriented in a direction of travel of the vehicle includes determining, by executing at least one instructions with the at least one processor, whether a rearview mirror marker of the vehicle has been detected by a sensor of the passenger device.

17. A tangible computer readable storage medium comprising instructions that, when executed, cause a machine to at least:
  determine an anticipated autonomous maneuver of a vehicle based on collected information corresponding to autonomous operation of the vehicle;
  determine whether a passenger device is an augmented reality (AR) device;
  determine whether the passenger device is oriented in a direction of travel of the vehicle;
  in response to determining that the passenger device is not an AR device or that the passenger device is not oriented in the direction of travel of the vehicle, instruct the passenger device to present at least one of haptic feedback or a notification message indicative of the anticipated autonomous maneuver; and
  in response to determining that the passenger device is an AR device oriented in the direction of travel of the vehicle:
    generate an AR-based visual representation of the anticipated autonomous maneuver; and
    instruct the passenger device to present the AR-based visual representation of the anticipated autonomous maneuver.

18. A storage medium as defined in claim 17, wherein the anticipated autonomous maneuver is at least one of acceleration, deceleration, stopping, object evasion, or a change of direction.

19. A storage medium as defined in claim 17, wherein the instructions, when executed, further cause the machine, in response to determining that the passenger device is an AR device oriented in the direction of travel of the vehicle, to:
  detect environment characteristics located outside of the vehicle; and
  instruct the passenger device to present the AR-based visual representation of the anticipated autonomous maneuver in spatial relation to the detected environment characteristics.

20. A storage medium as defined in claim 19, wherein the AR device is a wearable AR device, and the environment characteristics correspond to an environment visible to a passenger wearing the wearable AR device.

* * * * *

UNITED STATES PATENT AND TRADEMARK OFFICE
CERTIFICATE OF CORRECTION

| | |
|---|---|
| PATENT NO. | : 11,254,327 B2 |
| APPLICATION NO. | : 16/325016 |
| DATED | : February 22, 2022 |
| INVENTOR(S) | : Brandon Beauvais |

It is certified that error appears in the above-identified patent and that said Letters Patent is hereby corrected as shown below:

In the Claims

Column 20, Claim 14, Lines 3-4: replace "executing at least one instructions" with --executing at least one instruction--

Column 20, Claim 15, Lines 9-10: replace "executing at least one instructions" with --executing at least one instruction--

Column 20, Claim 16, Lines 15-16: replace "executing at least one instructions" with --executing at least one instruction--

Signed and Sealed this
Tenth Day of May, 2022

*Katherine Kelly Vidal*

Katherine Kelly Vidal
*Director of the United States Patent and Trademark Office*